United States Patent
Fehri et al.

(10) Patent No.: US 9,236,899 B2
(45) Date of Patent: Jan. 12, 2016

(54) CREST FACTOR REDUCTION OF INTER-BAND CARRIER AGGREGATED SIGNALS

(71) Applicant: Telefonaktiebolaget L M Ericsson (publ), Stockholm (SE)

(72) Inventors: Bilel Fehri, Waterloo (CA); Slim Boumaiza, Waterloo (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 14/178,536

(22) Filed: Feb. 12, 2014

(65) Prior Publication Data
US 2014/0362950 A1  Dec. 11, 2014

Related U.S. Application Data

(60) Provisional application No. 61/831,339, filed on Jun. 5, 2013, provisional application No. 61/886,317, filed on Oct. 3, 2013.

(51) Int. Cl.
| | | |
|---|---|---|
| *H04B 1/00* | (2006.01) | |
| *H04L 27/28* | (2006.01) | |
| *H04K 1/10* | (2006.01) | |
| *H04B 1/68* | (2006.01) | |
| *H04L 5/00* | (2006.01) | |
| *H04L 27/26* | (2006.01) | |

(52) U.S. Cl.
CPC ............ *H04B 1/68* (2013.01); *H04L 5/001* (2013.01); *H04L 27/2624* (2013.01)

(58) Field of Classification Search
USPC ................ 455/67.11, 114.2, 115.1, 501, 574; 375/260, 296, 297
See application file for complete search history.

(56) References Cited

U.S. PATENT DOCUMENTS

| | | |
|---|---|---|
| 7,194,039 B2 | 3/2007 | Hunton |
| 2010/0027690 A1 | 2/2010 | Liang et al. |
| 2013/0163512 A1 | 6/2013 | Rexberg et al. |

FOREIGN PATENT DOCUMENTS

WO  2013066639 A1  5/2013

OTHER PUBLICATIONS

International Search Report and Written Opinion dated Sep. 16, 2014 for International Application No. PCT/IB2014/061059, International Filing Date: Apr. 28, 2014 consisting of 13-pages.
Srivastava et al., "Crest_Factor_Reduction_for_Carrier_Aggregated_OFDM_Systems" Published by IEEE in "Software, Telecommunications and Computer Networks (SoftCOM)", 2012 20th International Conference held Sep. 11, 2012, pp. 1-6.
Gilabert_et al., "3D Digital Predistortion for Dual-Band Envelope Tracking Power Amplifiers" Published by IEEE in Microwave Conference Proceedings (APMC), 2013 Asia-Pacific Conference in Seoul, South Korea, Nov. 5-8, 2013; pp. 734-736 consisting of 4-pages.

*Primary Examiner* — Blane J Jackson
(74) *Attorney, Agent, or Firm* — Christopher & Weisberg, P.A.

(57) ABSTRACT

A method, system and circuit for crest factor reduction of inter-band multi-standard carrier aggregated signals are disclosed. In one embodiment, a method includes calculating the amplitude of each of the plurality of carrier signals of the inter-band carrier aggregated signals. An estimate of an envelope of a combination of the carrier signals is produced based on a sum of the calculated amplitudes of the plurality of carrier signals. The estimate of the envelope of the combination of the carrier signals is compared to a clipping threshold to determine whether to clip each of the plurality of carrier signals.

21 Claims, 11 Drawing Sheets

CREST FACTOR REDUCTION OF INTER-BAND CARRIER AGGREGATED SIGNALS

CROSS-REFERENCE TO RELATED APPLICATIONS

This application is related to and claims priority to U.S. Provisional Application Ser. No. 61/831,339, filed Jun. 5, 2013, entitled "CREST FACTOR REDUCTION OF INTER-BAND CARRIER AGGREGATED SIGNALS", and U.S. Provisional Application Ser. No. 61/886,317, filed Oct. 3, 2013, entitled "CREST FACTOR REDUCTION OF INTER-BAND MULTI-STANDARD CARRIER AGGREGATED SIGNALS", the entirety of which both are incorporated herein by reference.

TECHNICAL FIELD

This written description is directed to radio transmitters, and in particular, to crest factor reduction of inter-band carrier aggregated signals in radio transmitters of a communication system.

BACKGROUND

An absence of frequency spectrum bands that can support wide transmission bandwidths gives rise to intra-band or inter-band aggregation of multiple carriers according to specific sets of technical requirements. Such carrier aggregated signals have characteristics, such as high peak to average power ratio (PAPR), also commonly referred to as crest factor (CF), and wide bandwidth. The amplification of these carrier aggregated signals by a single power amplifier (PA) poses several challenges. A PA is required to maintain good power efficiency over multiple frequency bands. This has motivated recent research attempts to develop high efficiency, multi-band and broadband devices such as Doherty PAs and envelope tracking systems. In addition, due to the high CF of the carrier aggregated signals, these PAs are often required to operate in the large back off region from their peak power to meet linearity requirements. Consequently, these PAs yield poor power efficiency.

Several techniques have been devised for crest factor reduction (CFR) of single band signals and consequently enhance PA efficiency and reduce the dynamic-range requirement imposed on digital to analog converters. These techniques can be divided into two categories: distortion-less methods (commonly called linear CFR techniques), such as selected mapping, partial transmit sequence, tone injection, tone reservation, and coding; and distortion-based methods (also called nonlinear CFR techniques) such as clipping/windowing, companding, active constellation extension (ACE), and generalized ACE methods.

Linear techniques can achieve greater CF reduction than their nonlinear counterparts without altering signal quality. However, linear techniques usually require modifications to the receiver that may be incompatible with existing communication systems. Linear techniques have been applied to multicarrier/single-standard signals through proper modulation and coding. However, the generalization of linear techniques to carrier aggregated signals is not possible due to the dissimilarity between the modulation schemes employed in each carrier.

The nonlinear CFR techniques are generally carefully applied to obtain the highest possible CF reduction while not exceeding the distortion threshold. These techniques, and in particular, the clipping/windowing technique, have been applied to multi-carrier signals co-located in the same spectrum band. However application of clipping/windowing techniques to carrier aggregated signals, especially when each carrier is located in different and widely spaced frequency bands, is very challenging because the clipping/windowing techniques may require very high, and thus, impractical sampling rates.

A carrier aggregated signal over two bands, such as shown in FIG. 1, can be expressed as $$x(t) = x_1(t) + x_2(t) = \tilde{x}_1(t)e^{j\omega_1 t} + \tilde{x}_2(t)e^{j\omega_2 t} \quad (1)$$

where $x(t)$ is the carrier aggregated signal, $x_1(t)$ and $x_2(t)$ are the mixed mode signals in each band, and $\tilde{x}_1(t)\tilde{x}_2(t)$ denote the baseband envelopes of $x_1(t)$ and $x_2(t)$ around the angular frequencies $\omega_1$ and $\omega_2$, respectively. As shown in FIG. 1, the individual signals $x_1(t)$ and $x_2(t)$ have bandwidths B1 and B2, respectively, and are separated by a frequency gap S.

The carrier aggregated signal can be represented as a broadband signal with an angular carrier frequency $$\left(\frac{\omega_1 + \omega_2}{2}\right)$$

as given by:

$$\begin{aligned} x(t) &= x_1(t) + x_2(t) \\ &= \tilde{x}(t) \cdot e^{j\frac{\omega_1+\omega_2}{2}t} \\ &= \left(\tilde{x}_1(t) \cdot e^{j\frac{\omega_1-\omega_2}{2}t} + \tilde{x}_2(t) \cdot e^{j\frac{\omega_2-\omega_1}{2}t}\right)e^{j\frac{\omega_1+\omega_2}{2}t} \end{aligned} \quad (2)$$

where $\tilde{x}(t)$ is the baseband envelope of the carrier aggregated signal. The baseband envelope, $x(t)$, can be amplified using a dual-band or broadband PA instead of two single-band PAs in order to reduce a transmitter's cost and size. The carrier aggregation can result in an increased CF, which unless reduced, will require the designer to inefficiently operate the dual-band PA in its large back-off region.

The classical clipping/windowing nonlinear CFR technique can be applied to $\tilde{x}(t)$. In such case the CFR module may be a single-input single-output (SISO) unit that processes a digitized version of $\tilde{x}(t)$ which is sampled at a frequency $f_s'$, where $f_s' \geq 2 \cdot (S + \max(B_1/2, B_2/2))$, and $S$, $B_1$ and $B_2$ represent the frequency spacing and the bandwidths of the two signals, respectively. The digitized baseband signal $\tilde{x}(n')$ can then be expressed as follows:

$$\tilde{x}(n') = \tilde{x}_1(n')e^{j\frac{\omega_1-\omega_2}{2}\frac{n'}{f_s'}} + \tilde{x}_2(n')e^{j\frac{\omega_2-\omega_1}{2}\frac{n'}{f_s'}} \quad (3)$$

The classical clipping/windowing method consists of monitoring the instantaneous amplitude of the signal envelope, and limiting it to a preset threshold to obtain the targeted CF. A device for implementing the classical clipping/windowing method is shown in FIG. 2. As can be seen, in addition to the clipping 12 and filtering modules 14, the SISO CFR of FIG. 2 includes an up-sampler 16, a digital up-converter 18, a down-sampler 20 and a down-converter 22. As this technique is a nonlinear operation, inband distortions and out of band spectrum regrowth are induced. In order to achieve an acceptable adjacent channel power ratio (ACPR), the clipped signal is filtered. The clipping threshold is set so that the CF is reduced while conforming to error vector magnitude (EVM) and ACPR specifications.

The frequency spacing S between the two carriers is generally significantly greater than the bandwidths of $x_1(t)$ and $x_2(t)$, i.e. $B_1$ and $B_2$, especially in the case of inter-band aggregation scenarios. Hence, $f_s'$ would need to be considerably larger than the frequencies $f_{s1}$ and $f_{s2}$ needed to digitize $\tilde{x}_1(t)$ and $\tilde{x}_2(t)$, respectively ($f_{s1} \geq 2 \cdot B_1$, $f_{s2} \geq 2 \cdot B_2$).

For example, assume a carrier aggregated signal is composed of a 15 MHz wide band code division multiple access (WCDMA) signal around 2.1 GHz and a 10 MHz long term evolution (LTE) signal centered in 2.4 GHz. For such a combination, the minimum theoretical sampling frequency $f_s'$ must be higher than 610 MHz. This sampling frequency is significantly higher than the sampling frequencies needed to represent the WCDMA and LTE signals individually. The direct application of the SISO clipping/windowing to $\tilde{x}(n')$ is thus seen to imply a high and impractical sampling rate. The high sampling rate requirement associated with the conventional clipping and windowing approach makes this solution sub-optimal in the context of inter-band carrier aggregated signals.

SUMMARY

The present invention advantageously provides a method and system for crest factor reduction of inter-band multi-standard carrier aggregated signals. According to one aspect, the invention provides a method of reducing a crest factor of inter-band carrier aggregated signals, the inter-band carrier signals comprising a plurality of carrier signals. The method includes calculating the amplitude of each of the plurality of carrier signals of the inter-band carrier aggregated signals. An estimate of an envelope of a combination of the carrier signals is produced based on a sum of the calculated amplitudes of the plurality of carrier signals. The estimate of the envelope of the combination of the carrier signals is compared to a clipping threshold to determine whether to clip each of the plurality of carrier signals.

According to this aspect, in some embodiments, a ratio of the calculated amplitude of a first carrier signal of the plurality of carrier signals to the estimated sum of the amplitudes of each of the plurality of carrier signals is formed. The ratio is multiplied by the clipping threshold to clip the first carrier signal of the plurality of carrier signals. In some embodiments, a first carrier signal of the plurality of carrier signals is modulated as a wide band code division multiple access, WCDMA, carrier signal and a second carrier signal of the plurality of carrier signals is modulated as a long term evolution, LTE, carrier signal. In some embodiments, the method further includes filtering each clipped carrier signal of the plurality of carrier signals to reduce out of band spectrum regrowth. In some embodiments, the method includes clipping each carrier signal of the plurality of carrier signals separately. In some embodiments, a quantity of the plurality of carrier signals exceeds two. In some embodiments, the method further includes sampling each of the plurality of carrier signals at a rate that is at least twice a maximum bandwidth of the bandwidths of the plurality of carrier signals. The sampling rate may be substantially less than a least frequency spacing between any two carrier signals.

According to another aspect, the invention provides an apparatus for reducing a crest factor of inter-band carrier aggregated signals, the inter-band carrier aggregated signals comprising a plurality of carrier signals. The apparatus includes a plurality of signal amplitude calculators, one for each of the plurality of carrier signals. Each of the plurality of signal amplitude calculators is configured to calculate an amplitude of a corresponding carrier signal of the plurality of carrier signals. An adder is configured to add the calculated carrier signal amplitudes to produce a composite signal that is an estimate of an envelope of the plurality of carrier signals. A plurality of clippers, one for each of the plurality of carrier signals, are configured to perform a clipping operation on a respective one of the plurality of carrier signals.

According to this aspect, in some embodiments, performance of the clipping operation of a clipper is contingent on the composite signal exceeding a clipping threshold. In some embodiments, the clipping is based on a ratio of a calculated amplitude of the respective one of the plurality of carrier signals to the composite signal, and the ratio is multiplied by the clipping threshold to clip the respective one of the plurality of carrier signals. In some embodiments, a first carrier signal of the plurality of carrier signals is modulated according to a first modulation scheme and a second carrier signal of the plurality of carrier signals is modulated according to a second modulation scheme different from the first modulation scheme. In some embodiments, the sampling rate is substantially less than a closest spacing between any two carrier signals of the plurality of carrier signals. In some embodiments, each carrier is sampled at a rate that is substantially less than a closest spacing between any two carrier signals of the plurality of carrier signals.

According to another aspect, the invention provides a crest factor reduction circuit. The circuit includes a plurality of inputs, one input for each of a plurality of carrier signals. The circuit also includes a plurality of signal amplitude calculators. Each signal amplitude calculator is coupled to a different one of the plurality of inputs to receive a different one of the plurality of carrier signals and is configured to calculate an amplitude of the received carrier signal. An adder is configured to add the calculated amplitudes from the plurality of signal amplitude calculators to produce a composite signal producing an estimate of an envelope of the individual carrier signal amplitude estimates. A comparator is configured to compare the composite signal to a threshold to determine whether to clip amplitudes of the plurality of carrier signals.

According to this aspect, in some embodiments, the circuit further includes a clipper for each carrier signal of the plurality of carrier signals to clip an amplitude of the corresponding carrier signal if the composite signal exceeds the threshold. In some embodiments, each clipper forms a ratio of an estimated amplitude of a carrier signal of the plurality of carrier signals to the composite signal and multiplies the ratio by the threshold to clip the carrier signal. In some embodiments, the circuit includes a sampler to sample each carrier signal of the plurality of carrier signals at a rate that is substantially less than a least frequency spacing between any two carrier signals of the plurality of carrier signals. In some embodiments, the circuit includes a low pass filter applied to each clipped signal to reduce spectrum regrowth due to the clipping.

DETAILED DESCRIPTION

Figure 1:
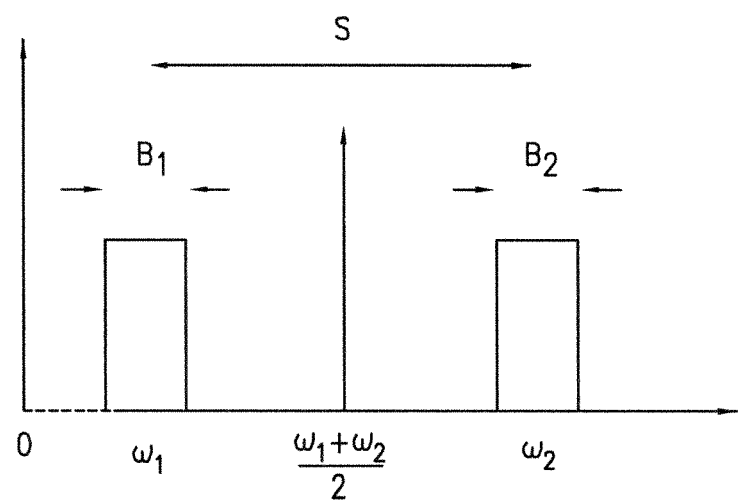
FIG. 1 is a diagram of two carrier signals separated by a frequency span.

Before describing in detail exemplary embodiments that are in accordance with the present invention, it is noted that the embodiments reside primarily in combinations of apparatus components and processing steps related to crest factor reduction of inter-band multi-standard carrier aggregated signals. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 3:
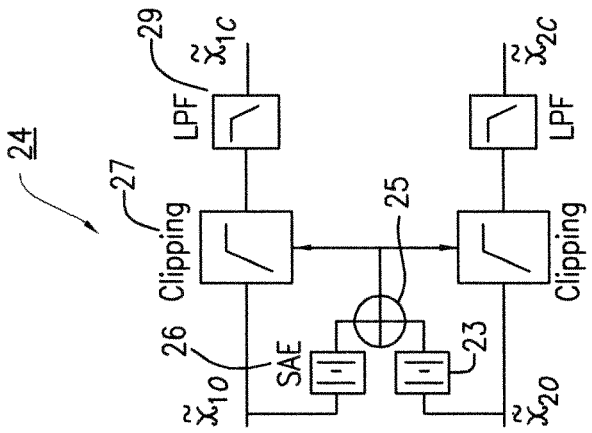
FIG. 3 is a block diagram of a crest factor reduction circuit constructed in accordance with principles of the present invention.
Figure 2:
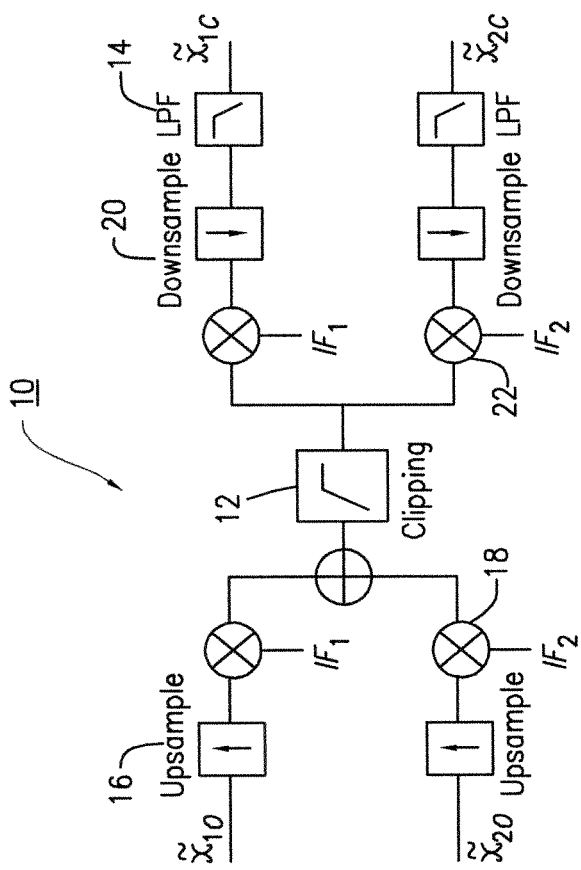
FIG. 2 is a block diagram of a known crest factor reduction circuit.

Referring now to the drawing figures, where like reference designators refer to like elements, there is shown in FIG. 3 a dual input dual output (DIDO) crest factor reduction (CFR) system 24, that includes a signal amplitude estimator (SAE) 26 to compute the instantaneous amplitude of the carrier aggregated signal using the baseband signals of the two carriers as a first step of the CFR process. The SAE 26 may be implemented using various types of hardware, including but not limited to application specific integrated circuitry, a digital signal processor or by a processor executing programmatic software to carry out the processing functions described herein. Such programmatic software may be stored in a non-transitory memory device.

First, the envelope of the carrier aggregated signal expression given in equation (2) can be rewritten as follows:

$$\tilde{x}(t) = |\tilde{x}_1(t)|e^{j\left(\frac{\omega_1-\omega_2}{2}t+\varphi_1(t)\right)} + |\tilde{x}_2(t)|e^{j\left(\frac{\omega_2-\omega_1}{2}t+\varphi_2(t)\right)}, \quad (4)$$

where $\varphi_1(t)$ and $\varphi_2(t)$ are the instantaneous phase of $\tilde{x}_1(t)$ and $\tilde{x}_2(t)$, respectively. The terms $$\left(\frac{\omega_1-\omega_2}{2}t\right)$$

and $$\left(\frac{\omega_2-\omega_1}{2}t\right)$$

in the exponents imply an additional phase difference between $\tilde{x}_1(t)$ and $\tilde{x}_2(t)$, which occurs at much higher speed than $\varphi_1(t)$ and $\varphi_2(t)$. In fact, the two terms in the right side of equation (4) can be in-phase at a given instant $t_0$ before both baseband envelopes evolve noticeably, i.e.:

$$e^{j\left(\frac{\omega_1-\omega_2}{2}t_0+\varphi_1(t_0)\right)} = e^{j\left(\frac{\omega_1-\omega_2}{2}t_0+\varphi_1(t_0)\right)}$$
$$= e^{j\left(\frac{\omega_2-\omega_1}{2}t_0+\varphi_2(t_0)\right)}$$
$$= e^{j\varphi_0(t_0)}.$$

At time instant $t_0$, the carrier aggregated signal envelope is given by $\tilde{x}(t_0)=(|\tilde{x}_1(t_0)|+|\tilde{x}_2(t_0)|)e^{j\varphi_0(t_0)}$. Hence, the carrier aggregation process yields an instantaneous full constructive addition even if the two carriers' envelopes are out of phase, i.e., $|\tilde{x}(t_0)|=(|\tilde{x}_1(t_0)|+|\tilde{x}_2(t_0)|)$. The envelope of the carrier aggregated signal is therefore given by $$\text{envelope}\left(\tilde{x}_1(t)e^{j\frac{\omega_1-\omega_2}{2}t} + \tilde{x}_1(t)e^{j\frac{\omega_1-\omega_2}{2}t}\right) \cong |\tilde{x}_1(t)| + |\tilde{x}_2(t)|. \quad (5)$$

As a result, the CF of the carrier aggregated signal can be estimated by monitoring the magnitude of the two carriers' baseband signals. Furthermore, equation (5) suggests that the envelope of $\tilde{x}(t)$ can be obtained using the envelopes of $\tilde{x}_1(t)$ and $\tilde{x}_2(t)$ sampled at a rate $f_s=\max(f_{s1},f_{s2})$.

$$\text{envelop}(\tilde{x}(n)) \approx (|\tilde{x}_1(n)|+|\tilde{x}_2(n)|). \quad (6)$$

Thus, the envelope can be estimated as a sum of the amplitudes of the plurality of carrier signals sampled at a Nyquist rate that is a maximum of the Nyquist rates of the individual carrier signals. Since the bandwidth associated with the carrier signals is substantially less than a spacing between carrier signals, the sampling of the envelope is at a rate that is substantially less than the spacing between the carrier signals. For example, a typical bandwidth associated with a carrier signal may be 15 Mega-Hertz, whereas the spacing between carrier signals may be 300 Mega-Hertz. Sampling at the Nyquist rate based on the bandwidth associated with a carrier signal would result in sampling at a rate of about 30 MHz, which is substantially less than a sampling rate of 330 MHz, i.e., less than the sampling rate by an order of 10, based on spacing between carrier signals. The amplitudes are computed by magnitude operators 23 and the sum of the amplitudes of the plurality of carrier signals is obtained by an adder 25. The magnitude operators 23 and the adder 25 for computing the expression of equation (6) may be referred to collectively as a signal amplitude estimator (SAE) or signal amplitude calculator 26.

Thus, one embodiment is an apparatus for reducing a crest factor of inter-band carrier aggregated signals, the inter-band carrier aggregated signals comprising a plurality of carrier signals. The apparatus includes a plurality of signal amplitude calculators 26, one for each of the plurality of carrier signals. Each of the plurality of signal amplitude calculators 26 is configured to calculate an amplitude of a corresponding carrier signal of the plurality of carrier signals. The adder 25 is configured to add the calculated carrier signal amplitudes to produce a composite signal that is an estimate of an envelope of the plurality of carrier signals. A plurality of clippers 27, one for each of the plurality of carrier signals, are configured to perform a clipping operation on a respective one of the plurality of carrier signals. The low pass filters 29 reduce out-of-band spectrum regrowth. Note that although FIG. 3 shows functionality for crest factor reduction of only two bands, embodiments may provide crest factor reduction for signals with three or more bands by direct extension of the principles described with reference to FIG. 3.

Figure 4:
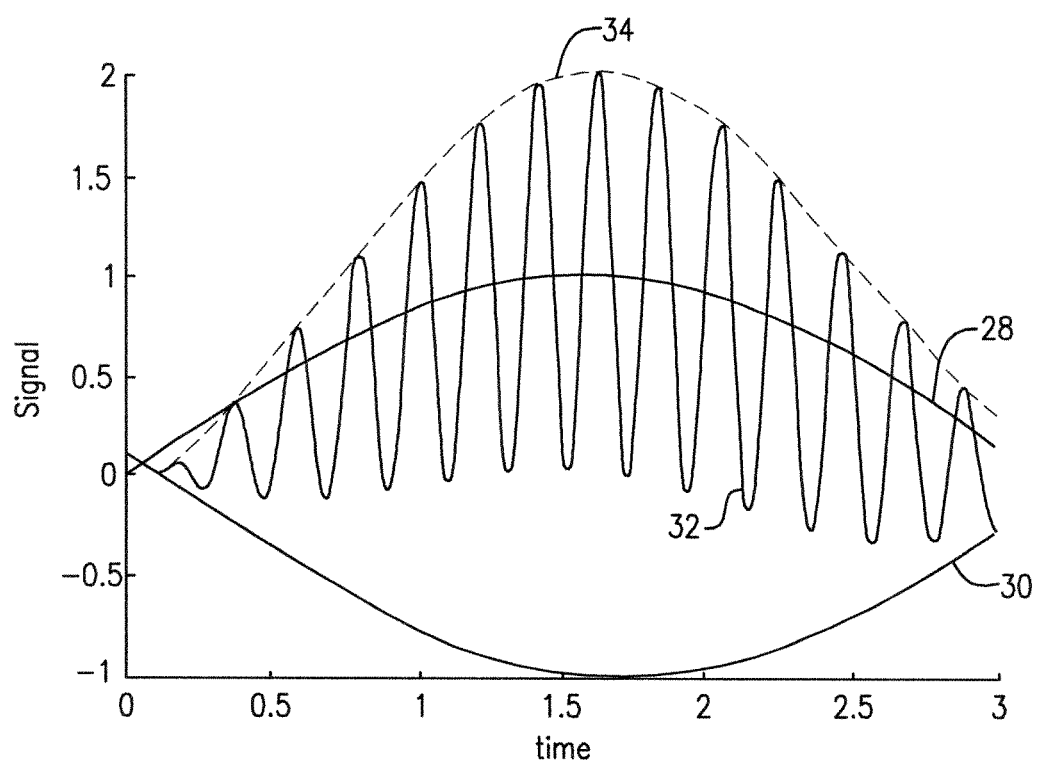
FIG. 4 is a graph of two carriers signals and the signal resulting from their combination.

FIG. 4 shows two sine waves 28 and 30 that are combined to produce the resulting signal 32. The summation of the two magnitudes of the two sine waves 28 and 30 provide a good estimate of the envelope 34 of the carrier aggregated signal 32. Hence, given an arbitrary clipping threshold Pk, the CFR of a carrier aggregated signal composed of two carriers with respective envelopes $\tilde{x}_1(n)$ and $\tilde{x}_2(n)$ can be obtained by clipping each carrier baseband signal as follows:

$$\text{If } |\tilde{x}_1(n)| + |\tilde{x}_2(n)| + |\tilde{x}_3(n)| > Pk$$

$$\Rightarrow \quad |\tilde{x}_{1\_clipped}(n)| = \frac{|\tilde{x}_1(n)|}{|\tilde{x}_1(n)| + |\tilde{x}_2(n)|} \cdot Pk$$

$$|\tilde{x}_{2\_clipped}(n)| = \frac{|\tilde{x}_2(n)|}{|\tilde{x}_1(n)| + |\tilde{x}_2(n)|} \cdot Pk$$

The clipping function may be performed by a clipper 27 for each carrier signal. The clipping may be performed, for example, by application specific integrated circuitry, or other combinations of hardware and/or software described above.

Note that the results for two carriers described above can be extended straightforwardly to more than two carriers. A carrier aggregated signal over multi-bands is given by:

$$x(t) = \sum_{i=1}^{N} x_i(t)$$

$$= \text{Re}\left(\sum_{i=1}^{N} \tilde{x}_i(t) e^{j\omega_i t}\right),$$

where N is the number of carrier aggregated bands, x(t) is the carrier aggregated signal, $x_i(t)$ is the mixed mode signals in the $i^{th}$ band, $\tilde{x}_i(t)$ denotes the baseband envelopes of $x_i(t)$ around the angular frequency $\omega_i$.

In order to clip the signal x(t) by conventional means, it may be modeled as one envelope signal around a carrier angular frequency $\omega_0$ given by a middle point of the two spectrum extremes:

$$\omega_0 = \frac{1}{2}(\max(\omega_i; i = 1 \ldots N) + \min(\omega_i; i = 1 \ldots N)).$$

In this case, the sampling rate of the signal should be $$f'_s \geq 2 \cdot \left(S + \max\left(\frac{B_i}{2}\right)\right),$$

where $f_s'$ is the required sampling rate for the mixed signal, $$S = \frac{1}{2 \cdot \pi} \cdot (\max(\omega_i; i = 1 \ldots N) - \min(\omega_i; i = 1 \ldots N)),$$

and $B_i$ is the bandwidth of signal $\tilde{x}_i(t)$. Alternatively, it can be shown that, $$\text{envelop}(x(t)) \cong \sum_{i=1}^{N} |\tilde{x}_i(t)|.$$

As a result, the CF of the carrier aggregated signal can be estimated by monitoring the magnitude of the different carriers' baseband signals. The envelope of $\tilde{x}(t)$ can be obtained using the envelopes of $\tilde{x}\_i(t)$ sampled at a rate $f\_s=\max(f\_(s\_i)=1/B\_i; i=1 \ldots N)$, where $B\_i$ is the bandwidth of signal $x\_i(t)$.

Hence, given an arbitrary clipping threshold Pk, the CFR of a carrier aggregated signal can be obtained by clipping each carrier baseband signal as follows:

$$\forall k \in \{1 \ldots N\},$$

$$\text{If}$$

$$\sum_{i=1}^{N} |\tilde{x}_i(t)| > Pk$$

$$\Rightarrow \quad |\tilde{x}_{k\_clippard}(n)| = \frac{|\tilde{x}_k(n)|}{\sum_{i=1}^{N} |\tilde{x}_i(t)|} \cdot Pk.$$

For the case of a tri-band signal, the tri-input tri-output CFR is implemented as:

$$\text{If } |\tilde{x}_1(n)| + |\tilde{x}_2(n)| + |\tilde{x}_3(n)| > Pk$$

$$|\tilde{x}_{1\_clipped}(n)| = \frac{|\tilde{x}_1(n)|}{|\tilde{x}_1(n)| + |\tilde{x}_2(n)| + |\tilde{x}_3(n)|} \cdot Pk$$

$$\Rightarrow \quad |\tilde{x}_{2\_clipped}(n)| = \frac{|\tilde{x}_2(n)|}{|\tilde{x}_1(n)| + |\tilde{x}_2(n)| + |\tilde{x}_3(n)|} \cdot Pk$$

$$|\tilde{x}_{3\_clipped}(n)| = \frac{|\tilde{x}_3(n)|}{|\tilde{x}_1(n)| + |\tilde{x}_2(n)| + |\tilde{x}_3(n)|} \cdot Pk$$

Figure 5:
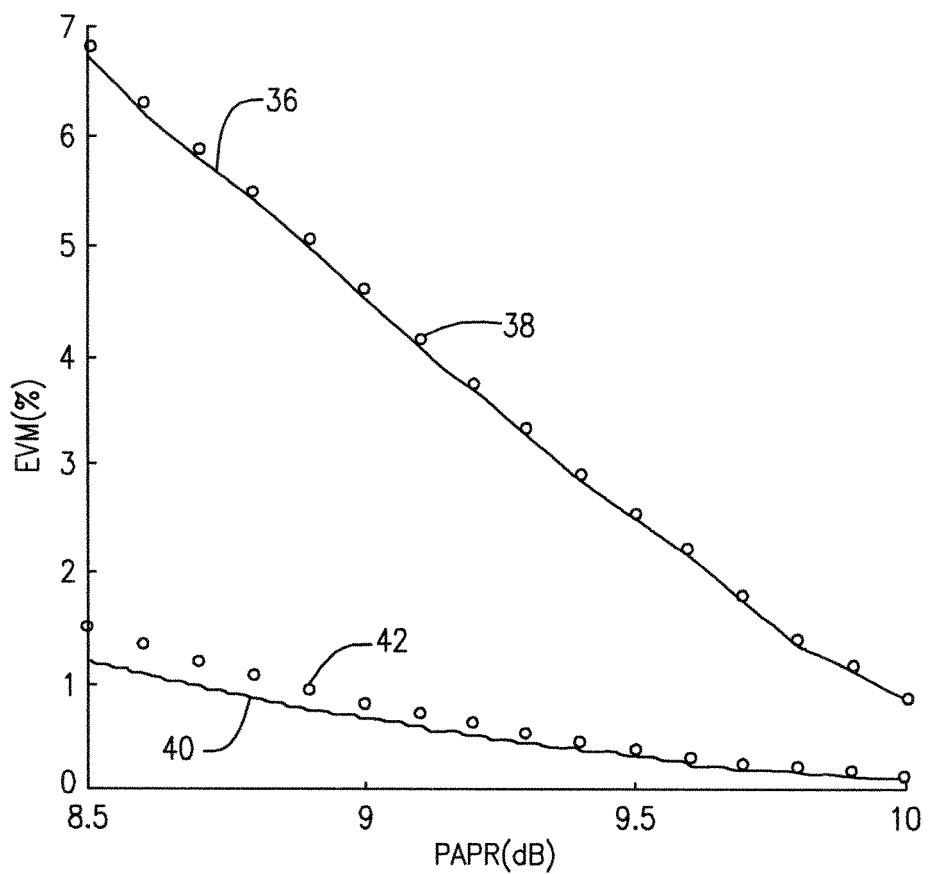
FIG. 5 is a graph of experimental error vector magnitude (EVM) performance for a single input single output (SISO) crest factor reduction circuit and a dual input dual output (DIDO) crest factor reduction circuit.
Figure 6:
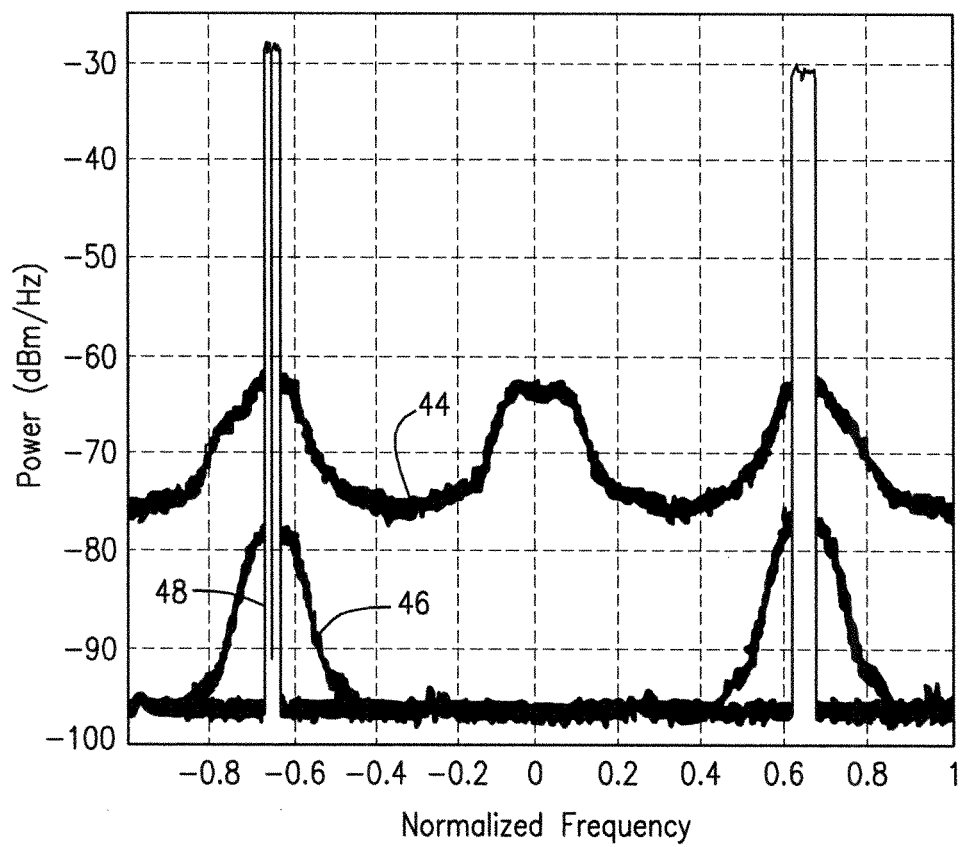
FIG. 6 is a graph of power output of crest factor reduction circuits for SISO and DIDO.

To test the method described above, an inter-band carrier aggregated signal was synthesized, composed of a 10 MHz 2C WCDMA signal and a 15 MHz LTE signal, separated by 300 MHz. Both the DIDO and SISO CFR approaches were applied to the synthezied carrier aggregated signal. The SISO CFR technique was carried out at a sampling frequency equal to $f_s'$=610 MHz. Next, the DIDO CFR technique was applied to the two separate baseband components and was performed at a sampling frequency equal to $f_s$=92.16 MHz. EVM performance of the two approaches vs. targeted PAPR is shown in FIG. 5 and spectrum regrowth due to the nonlinear clipping operation is shown in FIG. 6. FIG. 5 shows the error vector magnitude (EVM) performance for band 1 with SISO CFR 36, EVM performance for band 2 with SISO CFR 38, EVM performance for band 1 with DIDO CFR 40 and EVM performance for band 2 with DIDO CFR 42. Clearly, using the crest factor reduction methods described herein result in a substantial reduction in error vector magnitude. Similarly, FIG. 6 shows power versus frequency for SISO CFR 44, DIDO CFR 46, and DIDO CFR with filtering 48. Clearly, the crest factor reduction methods described herein result in substantial reduction of out-of-band signals arising due to distortion.

In order to remove the out of band spectrum regrowth of the DIDO CFR 46, the clipped signal is filtered by a filtering/windowing process 29. Filtering results are given by the curve 48. It is noted that the filtering is not applied to the SISO CFR due to its poor performance. Table 1 summarizes the original signal characteristics and the results of the DIDO CFR with and without filtering. The PAPR of the original frequency aggregated signal is decreased from 10.5 dB to 9 dB with around 0.7% EVM. The clipping/windowing iterations enable the removal of the spectrum regrowth at the cost of increasing the EVM to 1.3%, which is still acceptable by different modulation schemes, e.g., MSK, BPSK, etc.

TABLE 1

| | Signal | PAPR (dB) | EVM (%) | ACLR (dBc) |
|---|---|---|---|---|
| Original signal | 2C WCDMA @ band 1 | 7.9 | 0 | 68 |
| | LTE15 @ band 2 | 9.2 | 0 | 65 |
| | Frequency aggregated | 10.5 | | |
| Clipped signal | 2C WCDMA @ band 1 | 7.9 | 0.6 | 48 |
| | LTE15 @ band 2 | 9.2 | 0.8 | 50 |
| | Frequency aggregated | 9 | | |
| Clipped & filtered signal | 2C WCDMA @ band 1 | 7.9 | 1.3 | 68 |
| | LTE15 @ band 2 | 9.2 | 1.3 | 65 |
| | Frequency aggregated | 9.1 | | |

Figure 7:
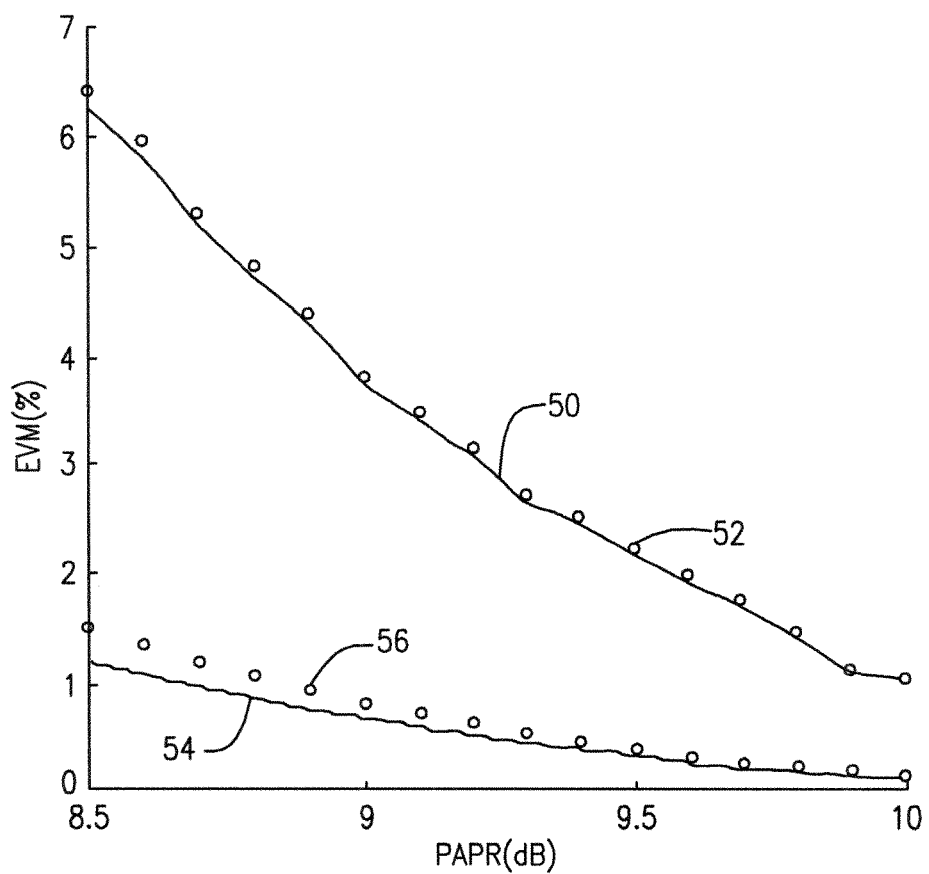
FIG. 7 is a graph of experimental EVM performance for a SISO and DIDO crest factor reduction circuits.
Figure 8:
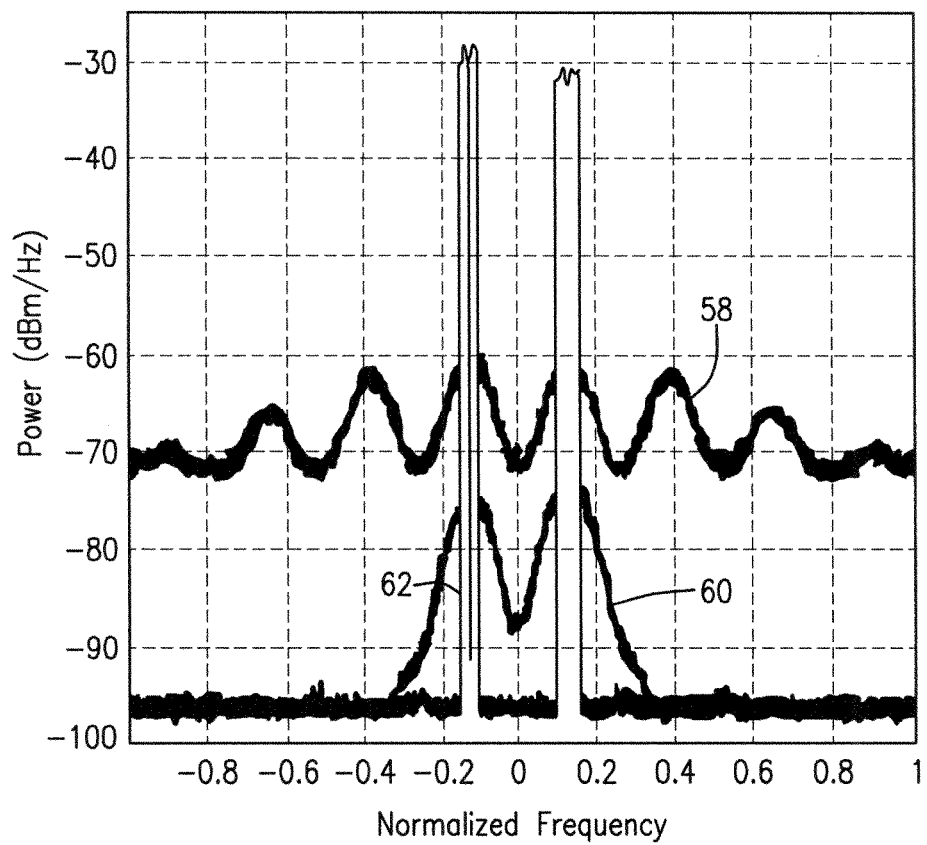
FIG. 8 is a graph of power output of crest factor reduction circuits for SISO and DIDO.

Concerning the SISO CFR performance, in addition to its high sampling rate of up to five times the Nyquist rate of the input signal, it is shown in FIG. 5 and FIG. 6 that EVM and spectrum regrowth is significantly poor when compared to the DIDO CFR case. The EVM performance of the two approaches vs. targeted PAPR is shown in FIG. 7 and spectrum regrowth due to the nonlinear clipping operation is shown in FIG. 8. FIG. 7 shows EVM for band 1 with SISO CFR 50, EVM for band 2 with SISO CFR 52, EVM for band 1 with DIDO CFR 54 and DIDO for band 2 with DIDO CFR 56. FIG. 8 shows power versus frequency for SISO CFR 58, DIDO CFR 60 and DIDO CFR with filtering 62.

The original, clipped, and clipped and filtered signal characteristics for the synthesized inter-band carrier aggregated signals discussed above are shown below in Table 2. Although the results are comparable with the high frequency separation case, the spectrum plot of the SISO CFR signal 58 in FIG. 8 reveals the existence of intermodulation distortion components due to the nonlinear clipping operation acting on the two signals simultaneously. This is unlike the DIDO CFR case 60, 62, where each signal is clipped separately. Hence, the SISO technique generates more distortion, both in-band and out of band.

TABLE 2

| | Signal | PAPR (dB) | EVM (%) | ACLR (dBc) |
|---|---|---|---|---|
| Original signal | 2C WCDMA @ band 1 | 7.9 | 0 | 68 |
| | LTE15 @ band 2 | 9.2 | 0 | 65 |
| | Frequency aggregated | 10.4 | | |
| Clipped signal | 2C WCDMA @ band 1 | 7.9 | 0.9 | 45 |
| | LTE15 @ band 2 | 9.2 | 1.1 | 48 |
| | Frequency aggregated | 8.8 | | |

TABLE 2-continued

| | Signal | PAPR (dB) | EVM (%) | ACLR (dBc) |
|---|---|---|---|---|
| Clipped & filtered signal | 2C WCDMA @ band 1 | 7.9 | 1.3 | 68 |
| | LTE15 @ band 2 | 9.2 | 1.4 | 65 |
| | Frequency aggregated | 9 | | |

Figure 9:
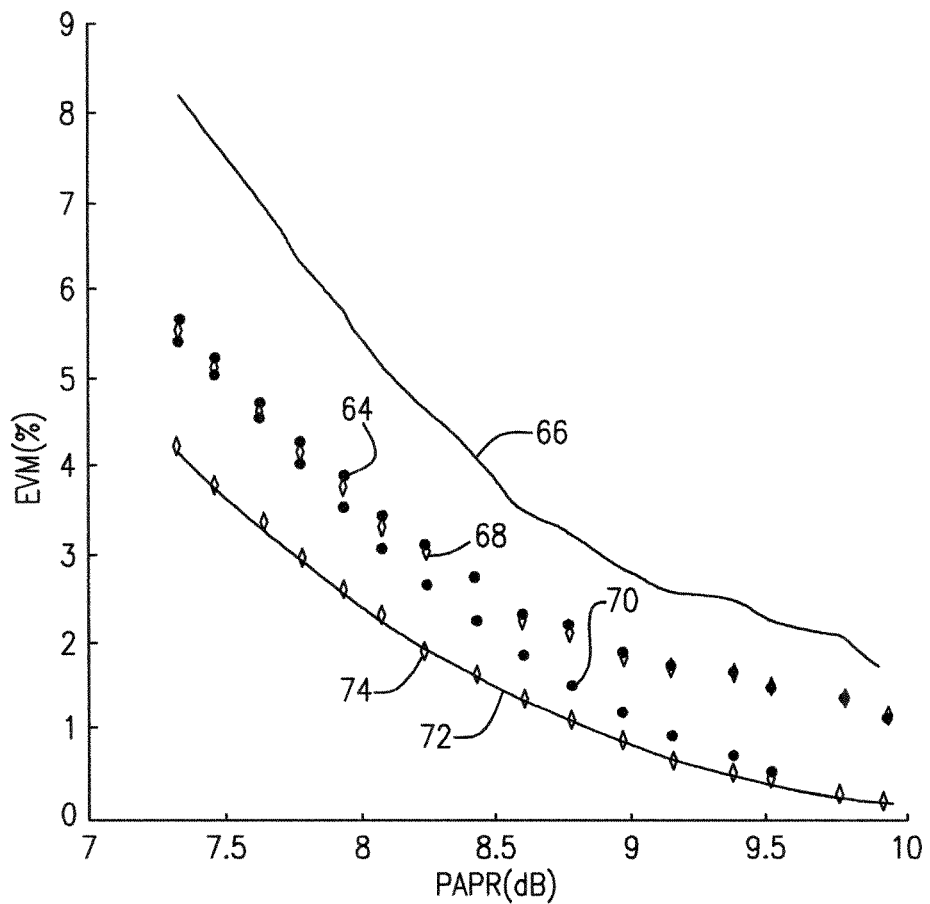
FIG. 9 is a graph of experimental EVM performance for SISO and tri-band crest factor reduction circuits.
Figure 10:
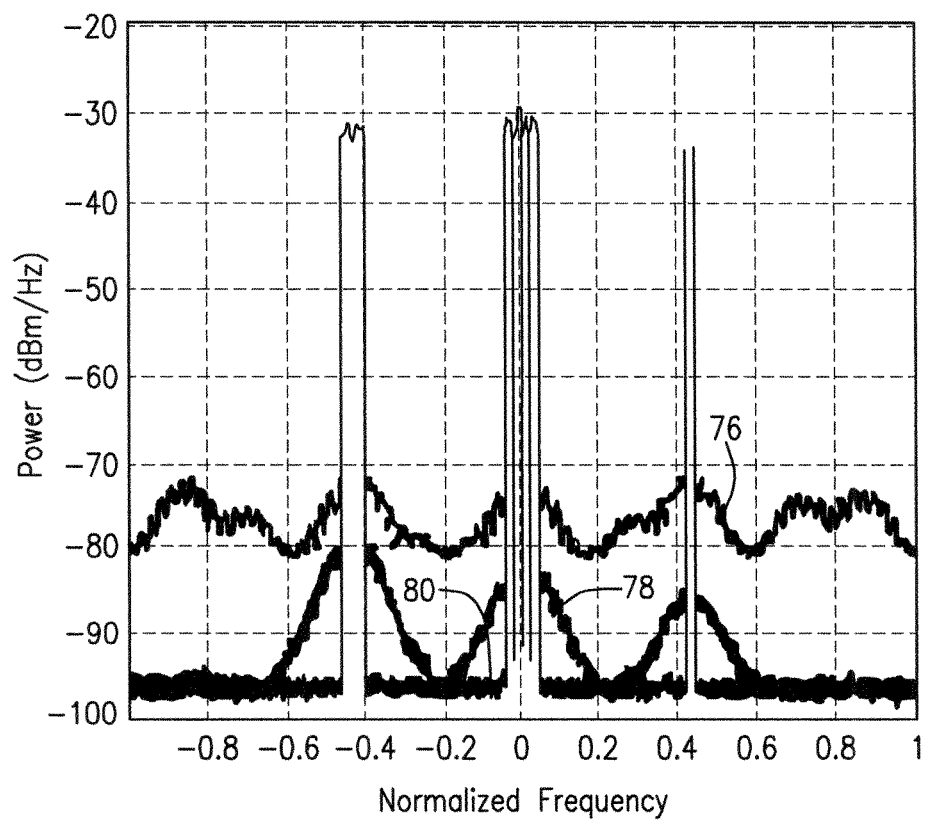
FIG. 10 is a graph of power output of crest factor reduction circuits for SISO and tri-band circuits.

In another example, an inter-band carrier aggregated signal was synthesized, composed of a 15 MHz LTE signal, 20 MHz 2C WCDMA signal and 5 MHz LTE signal. The first and second signals are separated by 100 MHz. The second and third signals are separated by 100 MHz too. Hence, the overall signal separation is 200 MHz. Both the tri-band and SISO CFR approaches were applied to the synthesized carrier aggregated signal. The SISO CFR technique was carried out at a sampling frequency equal to f=420 MHz. Next, the tri-band CFR technique was applied to the two separate baseband components and was performed at a sampling frequency equal to $f_s$=92.16 MHz. EVM performance of the two approaches vs. targeted PAPR is shown in FIG. 9 and spectrum regrowth due to the nonlinear clipping operation is shown in FIG. 10. FIG. 9 shows EVM for band 1 with SISO CFR 64, EVM for band 2 with SISO CFR 66, EVM for band 3 with SISO CFR 68, EVM for band 1 with tri-band CFR 70, EVM for band 2 with tri-band CFR 72, and EVM for band 3 with tri-band CFR 74. FIG. 10 shows power versus frequency for SISO CFR 76, tri-band CFR 78 and tri-band CFR with filtering 80.

The original and clipped signal characteristics of the synthesized tri-band carrier aggregated signals discussed above are summarized below in Table 3. It is shown that the tri-band CFR has outperformed the SISO CFR for the same reason detailed above.

TABLE 3

| | Signal | PAPR (dB) | EVM (%) | ACLR (dB) |
|---|---|---|---|---|
| Original signal | LTE15 @ band 1 | 9.2 | 0 | 65 |
| | 4C WCDMA @ band 2 | 9 | 0 | 65 |
| | LTE5 @ band 3 | 9.1 | 0 | 65 |
| | Frequency aggregated | 11.3 | | |
| Clipped signal | LTE15 @ band 1 | 9.2 | 0.6 | 48 |
| | 4C WCDMA @ band 2 | 9 | 0.7 | 51 |
| | LTE5 @ band 3 | 9.1 | 0.5 | 50 |
| | Frequency aggregated | 9.4 | | |
| Clipped & filtered signal | LTE15 @ band 1 | 9.2 | 1.3 | 65 |
| | 4C WCDMA @ band 2 | 9 | 1.4 | 65 |
| | LTE5 @ band 3 | 9.1 | 1.7 | 65 |
| | Frequency aggregated | 9.5 | | |

As an application of the technique described herein, the output signal of the CFR was applied to two power amplifiers, a 45 W GaN single ended PA and a 250 W LDMOS Doherty PA. Hence, using the threshold of 2% as a maximum tolerable EVM, the tri-band CFR allowed for about 2 dB reduction in PAPR while the SISO approach was limited to a 0.5 dB reduction in PAPR. Efficiency results are shown in Table 4. It is shown that the achieved CFR of the test signal allows for significant improvement of the effective average power level by about 2 dB, and an increase in power efficiency by up to 5% when the test signal is applied to two amplifiers under test.

TABLE 4

| | PAPR (dB) | EVM (%) Band 1 | EVM (%) Band 2 | EVM (%) Band 3 | Effective average power | Efficiency (%) |
|---|---|---|---|---|---|---|
| Single ended PA | 11.3 | 0 | 0 | 0 | | 16 |
| | 9.5 | 1.3 | 1.4 | 1.7 | +2 dB | 20 |
| Doherty PA | 11.3 | 0 | 0 | 0 | | 40 |
| | 9.5 | 1.3 | 1.4 | 1.7 | +2 dB | 45 |

A multiple input multiple output (MIMO) CFR technique suitable for inter-band multi-standard carrier aggregated signals over two and three bands has been described. Compared to the conventional single input single output CFR approach, the proposed MIMO CFR allows for a significant decrease of the sampling rate which is made proportional to the maximum of the bandwidth of the two carriers rather than the spacing between them. The proposed CFR approach was demonstrated on a 300 MHz dual-band and a 200 MHz tri-band multi-standard carrier aggregated waveform composed of LTE and WCDMA signals. The CF of the aggregated signal was successfully reduced from 11.3 dB to 9.5 dB while minimizing impacts on EVM and ACPR of the output signal. Note that although examples of crest factor reduction for only two and three bands is shown herein, embodiments are not limited to two and three bands. Embodiments for crest factor reduction for more than three bands are contemplated and are a straightforward extension of the embodiments discussed herein.

Figure 11:
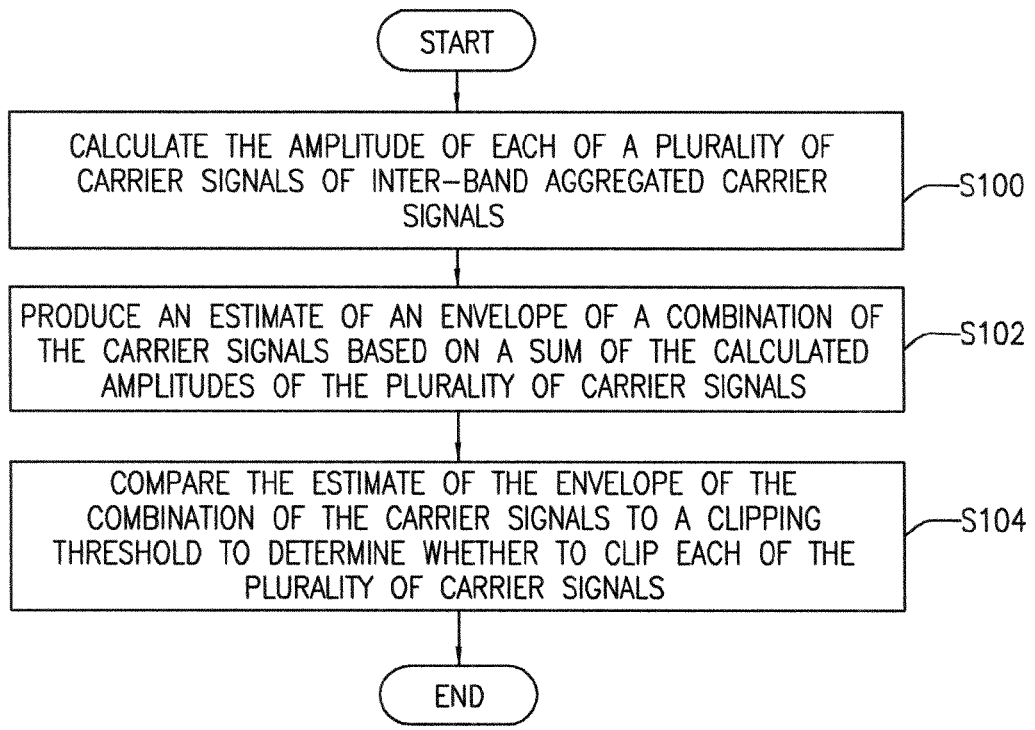
FIG. 11 is a flowchart of an exemplary process for achieving crest factor reduction according to principles of the present invention.
Figure 12:
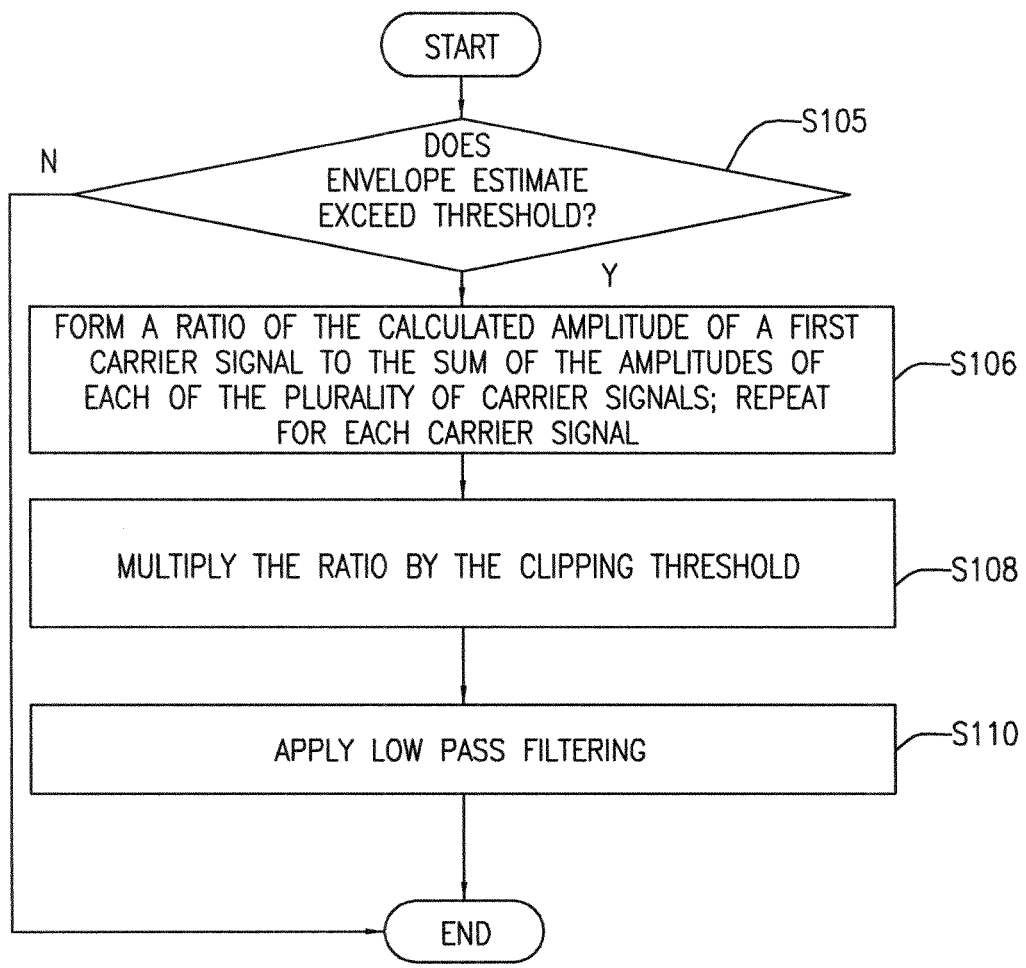
FIG. 12 is a flowchart of further steps of an exemplary process for achieving crest factor reduction according to principles of the present invention.

FIG. 11 is a flowchart of an exemplary process for reducing a crest factor of inter-band carrier aggregated signals. An amplitude of each of a plurality of carrier signals are estimated (block S100). An estimate of an envelope of a combination of the carrier signals is produced based on a sum of the estimated amplitudes of the plurality of carrier signals (block S102). The estimate of the envelope of the combination of carrier signals is compared to a clipping threshold to determine whether to clip each of the plurality of carrier signals (block S104). Continuing to FIG. 12, if the envelope exceeds the clipping threshold, (block S105), then a ratio of the estimated amplitude of a first carrier signal to the sum of the amplitudes of each of the plurality of carrier signals is formed; this ratio is formed for each carrier signal (block S106). Each ratio is multiplied by the clipping threshold (block S108). A low pass filter is then applied to reduce spectral regrowth (block S110).

By estimating the envelope of a combination of carrier signals based on a sum of estimated amplitudes of the individually carriers, one may determine when to clip the carrier signals using a sampling rate that is about equal to twice the bandwidth of the individual carrier signals, rather than at a sampling rate about equal to a spacing between the carrier signals.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of reducing a crest factor of inter-band carrier aggregated signals, the inter-band carrier signals comprising a plurality of carrier signals, the method comprising:
   calculating the amplitude of each of the plurality of carrier signals of the inter-band carrier aggregated signals;
   producing an estimate of an envelope of a combination of the carrier signals based on a sum of the calculated amplitudes of the plurality of carrier signals; and
   comparing the estimate of the envelope of the combination of the carrier signals to a clipping threshold to determine whether to clip each of the plurality of carrier signals.

2. The method of claim 1, further comprising:
   forming a ratio of the calculated amplitude of a first carrier signal of the plurality of carrier signals to the estimated sum of the amplitudes of each of the plurality of carrier signals; and
   multiplying the ratio by the clipping threshold to clip the first carrier signal of the plurality of carrier signals.

3. The method of claim 1, wherein a first carrier signal of the plurality of carrier signals is modulated as a wide band code division multiple access, WCDMA, carrier signal and a second carrier signal of the plurality of carrier signals is modulated as a long term evolution, LTE, carrier signal.

4. The method of claim 1, further comprising clipping each carrier signal of the plurality of carrier signals separately.

5. The method of claim 4, further comprising filtering each clipped carrier signal of the plurality of carrier signals to reduce out of band spectrum regrowth.

6. The method of claim 1, wherein a quantity of the plurality of carrier signals exceeds two.

7. The method of claim 1, further comprising sampling each of the plurality of carrier signals at a rate that is at least twice a maximum bandwidth of the bandwidths of the plurality of carrier signals.

8. The method of claim 7, wherein the sampling rate is substantially less than a least frequency spacing between any two carrier signals.

9. The method of claim 1, further comprising:
   sampling each carrier signal at a sampling rate that is substantially less than a least frequency spacing between any two carrier signals of the plurality of carrier signals.

10. An apparatus for reducing a crest factor of inter-band carrier aggregated signals, the inter-band carrier aggregated signals comprising a plurality of carrier signals, the apparatus comprising:
    a plurality of signal amplitude calculators, one for each of the plurality of carrier signals, each of the plurality of signal amplitude calculators configured to calculate an amplitude of a corresponding carrier signal of the plurality of carrier signals;
    an adder configured to add the calculated carrier signal amplitudes to produce a composite signal that is an estimate of an envelope of the plurality of carrier signals; and
    a plurality of clippers, one for each of the plurality of carrier signals, each of the plurality of clippers configured to perform a clipping operation on a respective one of the plurality of carrier signals.

11. The apparatus of claim 10, wherein performance of the clipping operation of a clipper is contingent on the composite signal exceeding a clipping threshold.

12. The apparatus of claim 11, wherein the clipping is based on a ratio of a calculated amplitude of the respective one of the plurality of carrier signals to the composite signal, and the ratio is multiplied by the clipping threshold to clip the respective one of the plurality of carrier signals.

13. The apparatus of claim 10, wherein a first carrier signal of the plurality of carrier signals is modulated according to a first modulation scheme and a second carrier signal of the plurality of carrier signals is modulated according to a second modulation scheme different from the first modulation scheme.

14. The apparatus of claim 10, wherein each carrier signal of the plurality of carrier signals is sampled at a rate that is a maximum Nyquist rate of the Nyquist rates of the individual carrier signals.

15. The apparatus of claim 14, wherein the sampling rate is substantially less than a closest spacing between any two carrier signals of the plurality of carrier signals.

16. The apparatus of claim 10, wherein each carrier is sampled at a rate that is substantially less than a closest spacing between any two carrier signals of the plurality of carrier signals.

17. A crest factor reduction circuit, comprising:
   a plurality of inputs, one input for each of a plurality of carrier signals;
   a plurality of signal amplitude calculators, each signal amplitude calculator coupled to a different one of the plurality of inputs to receive a different one of the plurality of carrier signals and being configured to calculate an amplitude of the received carrier signal;
   an adder configured to add the calculated amplitudes from the plurality of signal amplitude calculators to produce a composite signal producing an estimate of an envelope of the individual carrier signal amplitude estimates; and
   a comparator configured to compare the composite signal to a threshold to determine whether to clip amplitudes of the plurality of carrier signals.

18. The circuit of claim 17, further comprising a clipper for each carrier signal of the plurality of carrier signals to clip an amplitude of the corresponding carrier signal if the composite signal exceeds the threshold.

19. The circuit of claim 18, wherein each clipper forms a ratio of an estimated amplitude of a carrier signal of the plurality of carrier signals to the composite signal and multiplies the ratio by the threshold to clip the carrier signal.

20. The circuit of claim 17, further comprising a sampler to sample each carrier signal of the plurality of carrier signals at a rate that is substantially less than a least frequency spacing between any two carrier signals of the plurality of carrier signals.

21. The circuit of claim 17, further comprising a low pass filter applied to each clipped signal to reduce spectrum regrowth due to the clipping.

* * * * *